Nov. 25, 1924.
W. J. GEIST
MEASURING INSTRUMENT
Filed July 7, 1921
1,516,769
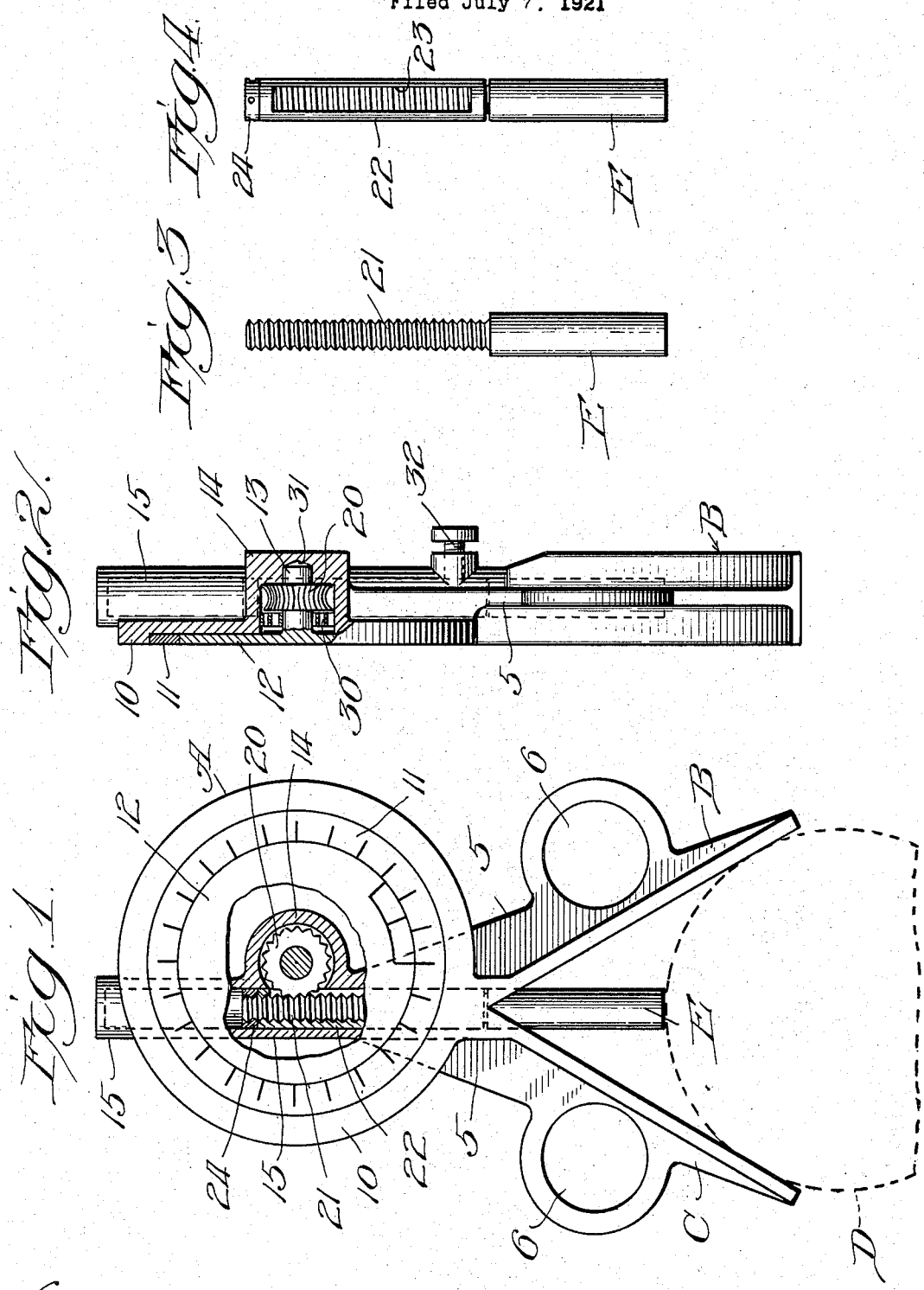

Patented Nov. 25, 1924.

1,516,769

UNITED STATES PATENT OFFICE.

WILLIAM J. GEIST, OF JOLIET, ILLINOIS.

MEASURING INSTRUMENT.

Application filed July 7, 1921. Serial No. 482,899.

*To all whom it may concern:*

Be it known that I, WILLIAM J. GEIST, a citizen of the United States, residing at Joliet, in the county of Will and State of Illinois, have invented certain new and useful Improvements in Measuring Instruments, of which the following is a specification.

This invention relates to an instrument in the nature of a gauge that is adapted to measure the diameter of cylindrical and spherical bodies. Various features and details combine to make up this invention which is clearly illustrated in the accompanying drawings in the manner following:

Figure 1 is a plan view of the instrument with a portion of the dial broken away to exhibit in section certain operating parts that are situated rearwardly thereof;

Fig. 2 is a side elevation, a portion of the instrument body being broken away to exhibit its interior construction;

Fig. 3 is a detail in elevation of the plunger; and

Fig. 4 is a similar view with the slotted sleeve and lock nut assembled on the plunger.

The body of the present instrument, designated as A, is provided with a pair of diverging jaws B and C, preferably making an angle of 60° with each other, so as to receive between them a cylindrical or spherical body D as shown. The jaws are preferably formed integral with the body of the instrument, their connection therewith being reinforced as by means of flanges 5 within each of which is shown a circular opening 6 to facilitate the use of the instrument. Slidably mounted between the jaws to project toward the center of the body D is a plunger E whose construction is of particular interest.

The body A comprises a circular portion 10 that is recessed in its face to receive a ring 11 inside of which is a rotatable dial 12 that is mounted on a shaft 13. This shaft extends rearwardly from the face of the instrument within a generally circular housing 14 that is formed integral with the body, and adjacent which extends a tubular housing 15 within which the plunger E may recede.

Carried by the dial shaft 13 is a pinion 20 having helical teeth which are adapted to mesh with the screw threads of a stem 21 that projects from one end of the plunger.

Also threaded upon this stem is a sleeve 22 having a longitudinal slot 23 extending for the major portion of its length, a lock nut 24 being also threaded to the stem to abut the sleeve so as to hold the same against rotation. Through the slot 23 in the sleeve the pinion 20 is adapted to engage with the threads of the plunger stem, as best appears in Fig. 1.

The plunger is normally projected outwardly between the jaws B and C under the action of a coiled spring 30 that is fastened at one end to the dial shaft and at its other end to the body, the spring being preferably arranged adjacent the pinion within the body housing 14. It will be observed that the shaft 13 is journaled within a bore 31 in the rear wall of this housing so as to provide a bearing for the dial that is rotated with each reciprocation of the plunger. A set screw 32 may be arranged in the wall of the tubular housing 15 so as to engage with the plunger for the purpose of holding the same in a fixed position of adjustment, whenever this may be desired.

The measurements of the cylindrical or spherical bodies to be determined by the present instrument are recorded preferably by means of a vernier scale, and for this purpose suitable graduations are provided on the ring 11 which is stationary, and on the dial 12 which is rotatable centrally thereof. With a device constructed in the manner described it is apparent that when the jaws B and C are placed in contiguous relation to a cylindrical or spherical surface, the plunger will be pressed inwardly against the tension of the spring 30 to a definite distance which is determined by the contour of the surface to be measured. The resulting position of the dial 12 in relation to the ring 11 will enable the user to determine from the graduations the exact diameter of the body which is being measured.

A special advantage results from the use of the slotted sleeve in conjunction with a plunger having a threaded stem. If at any time, due to wear or other causes, the instrument requires adjustment for correction, this may be accomplished by removing the plunger, loosening the lock nut, and screwing the sleeve to a different rotary position upon the stem. Thereafter when the parts are replaced, the plunger will occupy a slightly different longitudinal position relative to the axis of the pinion. By proper regulations, adjustments may be effected in this manner, so that the instrument will register correct measurements at all times.

I claim:

1. A device of the kind described, comprising a chambered body from which extends a pair of diverging jaws, a threaded plunger arranged to slide between the jaws into the body, a toothed pinion within the body chamber adapted to engage with the threads of said plunger, a rotatable dial having a shaft extending through the body chamber and connected fast with the pinion therein, whereby a rotary movement is imparted to the dial when the plunger is reciprocated, means for securing the plunger in a desired rotative position relative to the pinion, whereby its operative connection therewith is subject to adjustment, and a helical spring surrounding the shaft and connected thereto and to the body to rotate the dial in one direction, substantially as described.

2. In a device of the kind described, a body having a circular portion whose face is recessed, a graduated dial disposed within the recess, a shaft made fast to the dial and mounted to revolve within the body, a helical spring surrounding the shaft and connected therewith to rotate the dial in one direction, a toothed pinion carried by the shaft, a reciprocable plunger engaged with the pinion teeth in a manner to be moved therewith, means for securing the plunger in a desired rotative position relative to the pinion, whereby its connection therewith is subject to adjustment, and a pair of diverging jaws projecting laterally from the body, the plunger being adapted for movement outwardly between the jaws to engage with a circular object, substantially as described.

3. In a device of the kind described, the combination of a body from which projects a pair of diverging jaws, a measuring device mounted on the body, and operating means therefor including a plunger movably arranged between the jaws and formed with a threaded stem, a slotted sleeve arranged upon the stem, means for locking the sleeve in a selected position of rotary adjustment upon the stem, and a pinion having spirally cut teeth adapted to project through the sleeve slot to engage with the stem threads, the pinion having operative connection with the measuring device, substantially as described.

4. In a device of the kind described, the combination of a body from which projects a pair of diverging jaws, a plunger mounted to slide between the jaws, the plunger being reduced at one end to provide a stem which is threaded, a slotted sleeve screw threaded on the stem, a lock nut adjacent one end of the sleeve, the lock nut, sleeve, and plunger being substantially of uniform diameter, means within the body providing a mounting within which the plunger and its associated parts may freely slide, a rotatable dial, a shaft fixed thereto and mounted to rotate in the body, a pinion made fast to the shaft adapted to project through the sleeve slot to engage with the threads of the stem whereby the dial is rotated as the plunger is reciprocated, and spring means associated with the dial adapted normally to rotate the same in a direction which projects the plunger outwardly between the jaws, substantially as described.

WILLIAM J. GEIST.